(12) United States Patent
Lee et al.

(10) Patent No.: US 8,798,209 B2
(45) Date of Patent: Aug. 5, 2014

(54) ORTHOTOPE SPHERE DECODING METHOD AND APPARATUS FOR SIGNAL RECONSTRUCTION IN THE MULTI-INPUT MULTI-OUTPUT ANTENNA SYSTEM

(71) Applicant: Gwangju Institute of Science and Technology, Gwangju (KR)

(72) Inventors: Heung No Lee, Gwangju (KR); Hwan Chol Jang, Gwangju (KR)

(73) Assignee: Gwangju Institute of Science and Technology, Buk-gu, Gwangju (KR)

( * ) Notice: Subject to any disclaimer, the term of this patent is extended or adjusted under 35 U.S.C. 154(b) by 0 days.

(21) Appl. No.: 13/670,025

(22) Filed: Nov. 6, 2012

(65) Prior Publication Data

US 2014/0056389 A1     Feb. 27, 2014

(30) Foreign Application Priority Data

Aug. 27, 2012 (KR) .......................... 10-2012-0093627

(51) Int. Cl.
    *H04L 27/06* (2006.01)
(52) U.S. Cl.
    USPC ........... 375/341; 375/260; 375/295; 375/316; 375/340; 375/343
(58) Field of Classification Search
    USPC ......... 375/219, 260, 268, 271, 295, 316, 322, 375/324, 340, 341, 343, 347
    See application file for complete search history.

(56) References Cited

U.S. PATENT DOCUMENTS

| | | | | |
|---|---|---|---|---|
| 7,233,634 | B1 * | 6/2007 | Hassell Sweatman et al. | 375/346 |
| 7,986,752 | B2 * | 7/2011 | Nikopour-Deilami et al. | 375/341 |
| 8,437,421 | B2 * | 5/2013 | Eckert | 375/267 |
| 8,559,540 | B2 * | 10/2013 | Sun et al. | 375/265 |
| 8,559,543 | B1 * | 10/2013 | Lee et al. | 375/267 |
| 2009/0232232 | A1 * | 9/2009 | Duvaut et al. | 375/260 |
| 2009/0257530 | A1 * | 10/2009 | Shim et al. | 375/340 |
| 2012/0106684 | A1 * | 5/2012 | Eckert | 375/341 |
| 2012/0269303 | A1 * | 10/2012 | Paker et al. | 375/341 |
| 2013/0301758 | A1 * | 11/2013 | Reial et al. | 375/340 |

OTHER PUBLICATIONS

2011 Conference Record of the Forty Fifth Asilomar Conference on Signals, Systems and Computers, Pacific Grove, California, USA Nov. 6-9, 20122, 31 pages.
Jang, et al., "Predicting the Pruning Potential in Sphere decoding for Multiple-Input Multiple-Output Detection", pp. 937-938, published at the Conference Record of the Forty Fifth Asilomar Conference on Signals, Systems and Computers, Pacific Grove, California, USA Nov. 6-9, 20122.
2011 Conference Record of the Forty Fifth Asilomar Conference on Signals, Systems and Computers, Pacific Grove, California, USA Nov. 6-9, 20122.
Jang, et al., "Predicting the Pruning Potential in Sphere decoding for Multiple-Input Multiple-Output Detection", pp. 937-938, published at the Conference Record of the Forty Fifth Asilomar Conference on Signals, Systems and Computers, Pacific Grove, California, USA Nov. 6-9, 20122, 2011.

\* cited by examiner

*Primary Examiner* — Hirdepal Singh
(74) *Attorney, Agent, or Firm* — Nath, Goldberg & Meyer; Joshua B. Goldberg

(57) ABSTRACT

The present disclosure provides an orthotope sphere decoding method of a multiple antenna system. The method includes: tree mapping a node having highest pruning potential that can be predicted at a root of a tree of orthotope sphere decoding to a root level of the tree, among nodes to be mapped to the tree; and performing tree search of the orthotope sphere decoding on the nodes mapped to the tree.

9 Claims, 6 Drawing Sheets

Fig. 3
* $OSW = \delta_1 : \delta_2 : \cdots : \delta_N = 2:4:\cdots:3$
(A) The minimum required width for each level
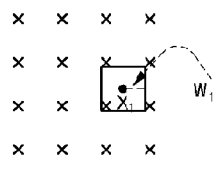
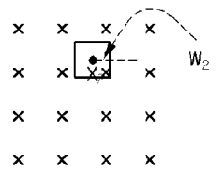
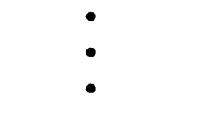
$w_1 : w_2 : \cdots : w_N = 10:8:\cdots:9$
(B) The minimum required radius for each level
$\sqrt{C_1} = w_1 / \delta_1 = 5$
$\sqrt{C_2} = w_2 / \delta_2 = 2$
$\sqrt{C_3} = w_3 / \delta_3 = 3$
$C_1 \neq C_2 \neq \cdots \neq C_N$
$C_{min} \neq \max_k(C_k) = C_1$
(C) The minimum orthotope
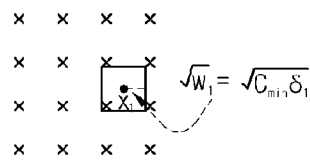
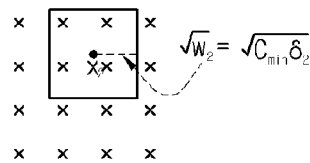
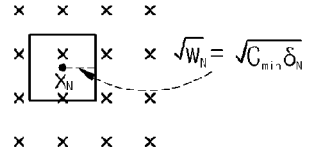
$w_1 : w_2 : \cdots : w_N = 2:4:\cdots:3$

Fig. 6

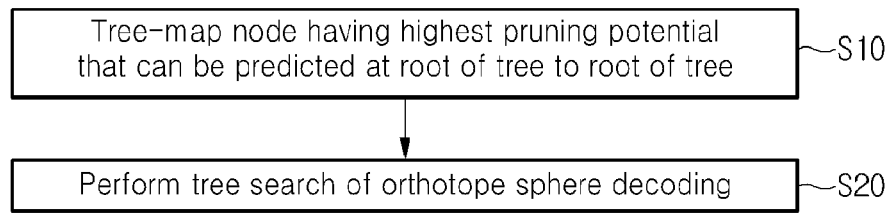

Fig. 7

```
Receive transmission symbols of multiple antenna system    — S111
                            ↓
Predict pruning potential at tree root
for each node to be mapped to tree                          — S112
                            ↓
Place node having highest pruning
potential at root level of tree                             — S113
```

Fig. 8

```
Calculate number of constellation points within
radius of threshold value set by OC test                    — S1121
                            ↓
Use a value calculated by subtracting the number of constellation points
within radius of threshold value from the total number of constellation    — S1122
points in node as upper bound of the number of the constellation points
```

ORTHOTOPE SPHERE DECODING METHOD AND APPARATUS FOR SIGNAL RECONSTRUCTION IN THE MULTI-INPUT MULTI-OUTPUT ANTENNA SYSTEM

CROSS-REFERENCE TO RELATED APPLICATION

This application claims priority to Korean Patent Application No. 10-2012-0093627 filed on 27 Aug. 2012 and all the benefits accruing therefrom under 35 U.S.C. §119, the contents of which are incorporated by reference in their entirety.

BACKGROUND

1. Technical Field

The present invention relates to an orthotope sphere decoding method for signal reconstruction in a multiple antenna system and an apparatus for the same, and more particularly, to an orthotope sphere decoding method for signal reconstruction in a multiple antenna system and an apparatus for the same, in which, in order to place a node that is most probable to be pruned at a root of a tree before tree search for orthotope sphere decoding is performed in the multiple antenna system, pruning potential is predicted, and each node is mapped to an orthotope tree according to the pruning potential at each level, thereby reducing complexity of decoding for signal reconstruction.

2. Description of the Related Art

As high-quality and high-speed data transmission is required in a wireless communication environment, a multiple-input and multiple-output (hereinafter, referred to as 'MIMO') system using a multiple antenna is used for efficient use of limited frequencies. The MIMO system can be operated according to a space-time coding scheme or a space-division multiplexing scheme. The space-time coding scheme is a technique capable of enhancing reliability of a wireless communication system by encoding data transmitted from different antennas. The space-division multiplexing scheme is a technique which increases data transmission rates by simultaneously transmitting data independent from one another through multiple antennas.

Various techniques have been proposed to detect transmission symbols from received symbols at a receiving end when the MIMO system transmits independent symbols through multiple transmission antennas in the space-division multiplexing scheme. The maximum likelihood (ML) detection technique calculates and compares Euclidean distance for all transmittable symbol vectors in order to detect the symbols. The ML detection technique searches for transmission symbols having a shortest Euclidean distance from a received signal for all combinations of transmittable transmission symbols. However, if the number of antennas and the scale of a modulation m scheme increase, complexity of the ML detection is exponentially increased, and thus it is very difficult to implement ML detection. In order to reduce the complexity of ML detection, a sphere decoding technique has been developed.

Since the sphere decoding technique calculates Euclidean distance only for a set of symbol vectors existing in a sphere having a radius that is set in the initial stage considering noise variance and channel state, it can reduce the complexity of ML detection. However, complexity of a sphere decoder varies depending upon initial radius and a method of searching for lattice vectors existing in a sphere. That is, if the initial radius is set too large, numerous lattice vectors may exist within the initial radius, and thus the sphere decoder will have a complexity almost equal to that of an ML detector. In addition, if the initial radius is too small, the sphere decoder is unable to search for an effective lattice vector. In addition, if SNR of the sphere decoder is low, the number of visiting nodes, i.e., complexity, abruptly increases when tree search is performed, and thus decoding efficiency is degraded.

BRIEF SUMMARY

Therefore, the present invention is aimed at providing an orthotope sphere decoding method for signal reconstruction in a multiple antenna system and an apparatus for the same, in which, in order to place a node that is most probable to be pruned at a root of a tree before tree search for orthotope sphere decoding is performed in the multiple antenna system, pruning potential is predicted, and each node is mapped to an orthotope tree according to the pruning potential at each level, and thus complexity of decoding for signal reconstruction can be reduced.

One aspect of the present invention provides an orthotope sphere decoding method of a multiple antenna system, which includes: tree mapping a node having highest pruning potential that can be predicted at a root of a tree of orthotope sphere decoding to a root level of the tree, among nodes to be mapped to the tree; and performing tree search of the orthotope sphere decoding on the nodes mapped to the tree.

The tree mapping may include: receiving transmission symbols of the multiple antenna system; predicting pruning potential at the tree root for each node that will be mapped to the tree in correspondence to each received transmission symbol; and placing a node having the highest pruning potential at the root level of the tree.

The predicting pruning potential may use, as the pruning potential, a numerical value which expresses possibility of a node to be pruned from the root of the tree through an OC-test.

The predicting pruning potential may use, as the pruning potential, an upper bound of the number of constellation points corresponding to each symbol of the node that will be pruned through the OC-test and removed through tree search.

The predicting pruning potential may include: calculating the number of constellation points within a radius of a threshold value set by the OC-test; and using, as the upper bound of the number of the constellation points, a value calculated by subtracting the number of constellation points within the radius of the threshold value from the number of all constellation points in the node.

The set threshold value may have an orthotope radius containing at least one constellation point within a radius from a center point of the orthotope.

If an O-metric of the constellation point satisfies the following equation, the constellation point is within the radius of the set threshold value, and otherwise, the constellation point is outside the radius of the set threshold value:

$$\Delta(s_k) \leq \sqrt{C_{min}} \cdot \delta_k,$$

wherein $$C_{min} = \max_{k=1,2,\ldots,N} \left[ (\delta_k^{-1})^2 \min_{s_k \in O} (\Delta^2(s_k)) \right],$$

$\delta_k$ denotes a k-th norm of an inverse channel matrix, $s_k$ denotes a constellation point, $\Delta(s_k)$ denotes the O-metric of $s_k$, and k denotes a level of an antenna.

The performing tree search may include performing the tree search by performing pruning on the mapped tree through the OC-test.

The tree mapping may include: receiving transmission symbols of the multiple antenna system; performing prior tree mapping on nodes corresponding to the received transmission symbols in a predetermined sequence of antennas; predicting the pruning potential at the tree root for each node in correspondence to each transmission symbol; and placing a node having the highest pruning potential at the root level of the priorly tree mapped tree based on a result of the prediction.

The placing a node at the root level may include performing tree mapping by exchanging positions of the node having the highest pruning potential and a node positioned at the root level of the priorly tree mapped tree.

The tree mapping may further include performing new tree mapping on the priorly tree mapped tree in descending order of pruning potential based on the result of the prediction.

Another aspect of the present invention provides an orthotope sphere decoding apparatus of a multiple antenna system, the apparatus comprising: a tree mapping unit which performs tree mapping of a node having highest pruning potential that can be predicted at a root of a tree of orthotope sphere decoding to a root level of the tree, among nodes to be mapped to the tree; and a tree search unit which performs tree search of the orthotope sphere decoding on the nodes mapped to the tree.

The tree mapping unit may include: a reception unit which receives transmission symbols of the multiple antenna system; a prediction unit which predicts pruning potential at the tree root for each node that will be mapped to the tree in correspondence to each received transmission symbol; and a placement unit which places a node having the highest pruning potential at the root level of the tree.

The prediction unit may use, as the pruning potential, a numerical value which expresses possibility of a node to be pruned from the root of the tree through an OC-test.

The prediction unit may use, as the pruning potential, an upper bound of the number of constellation points corresponding to each symbol of the node that will be pruned through the OC-test and removed through the tree search.

The prediction unit may calculate the number of constellation points within a radius of a threshold value set by the OC-test; and use, as the upper bound of the number of the constellation points, a value calculated by subtracting the number of constellation points within the radius of the threshold value from the number of all constellation points in the node.

According to the present invention, tree mapping is performed by placing a node having the highest pruning potential at a root of a tree, and thus more subordinate nodes can be pruned when the corresponding node is pruned in the process of tree search. Accordingly, the number of nodes to visit for tree search is reduced, and thus decoding performance of signal reconstruction can be improved in a multiple antenna system.

Further, since complexity of a receiver can be reduced while maintaining performance of a maximum likelihood (ML) receiver, the high-speed data transmission function, which is an advantage of the multiple antenna system, can be further improved, and thus data transmission rates can be improved in a variety of wireless and mobile communication fields.

BRIEF DESCRIPTION OF THE DRAWINGS

The above and other aspects, features, and advantages of the invention will become apparent from the detailed description of the following embodiments in conjunction with the accompanying drawings, in which:

FIG. 3 is a view of constellation points on a minimum orthotope in orthotope sphere decoding in accordance with one embodiment of the present invention;

FIG. 6 is a flowchart of an orthotope sphere decoding method in accordance with one embodiment of the present invention;

FIG. 7 is a flowchart of a tree mapping operation of an orthotope sphere decoding method in accordance with one embodiment of the present invention;

FIG. 8 is a flowchart of a potential prediction operation of an orthotope sphere decoding method in accordance with one embodiment of the present invention;

DETAILED DESCRIPTION

Figure 1:
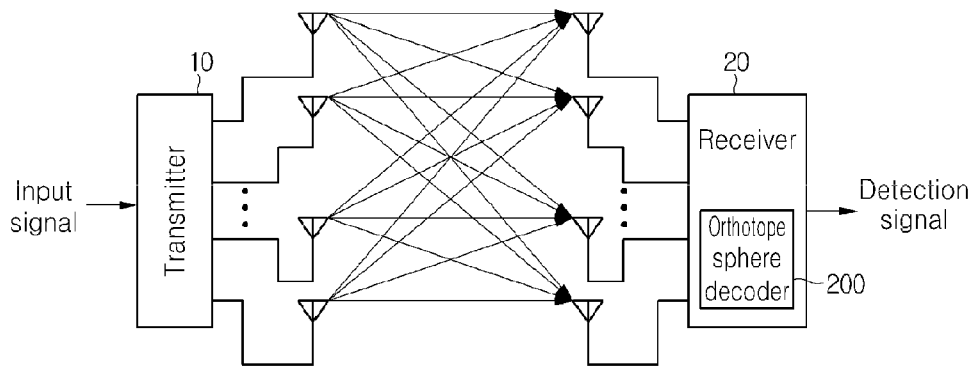
FIG. 1 is a block diagram of a multiple antenna system in accordance with one embodiment of the present invention.

Exemplary embodiments of the present invention will now be described in detail with reference to the accompanying drawings. However, it should be understood that the present invention is not limited to the following embodiments and may be embodied in different ways by those skilled in the art without departing from the scope of the present invention. Further, it should be understood that various modifications and equivalent embodiments may be made by those skilled in the art without departing from the spirit and scope of the present invention. In the drawings, the thicknesses of layers and regions can be exaggerated or omitted for clarity. The same components will be denoted by the same reference numerals throughout the specification.

FIG. 1 is a block diagram showing the configuration of a multiple antenna system in accordance with one embodiment of the present invention.

Referring to FIG. 1, a multiple antenna system in accordance with one embodiment of the present invention includes a transmitter 10 for transmitting independent symbols through a plurality of transmission antennas and a receiver 20 for detecting transmission symbols from reception symbols received through a plurality of reception antennas.

The transmitter 10 encodes and interleaves a bit stream corresponding to an input signal to be transmitted, and converts the bit stream in series and in parallel according to the number of antennas. Lattice symbols converted in parallel are simultaneously transmitted through multiple antennas. The receiver 20 receives the lattice type symbols transmitted from the plurality of antennas provided in the transmitter 10, detects a plurality of independent transmission symbols included in the received symbols, and outputs a detection signal. The receiver 20 includes an orthotope sphere decoder 200 for detecting the transmission symbols. The orthotope sphere decoder 200 searches for transmission symbols having a minimum Euclidean distance for lattice vectors existing in a sphere having a predetermined initial radius.

Figure 2:
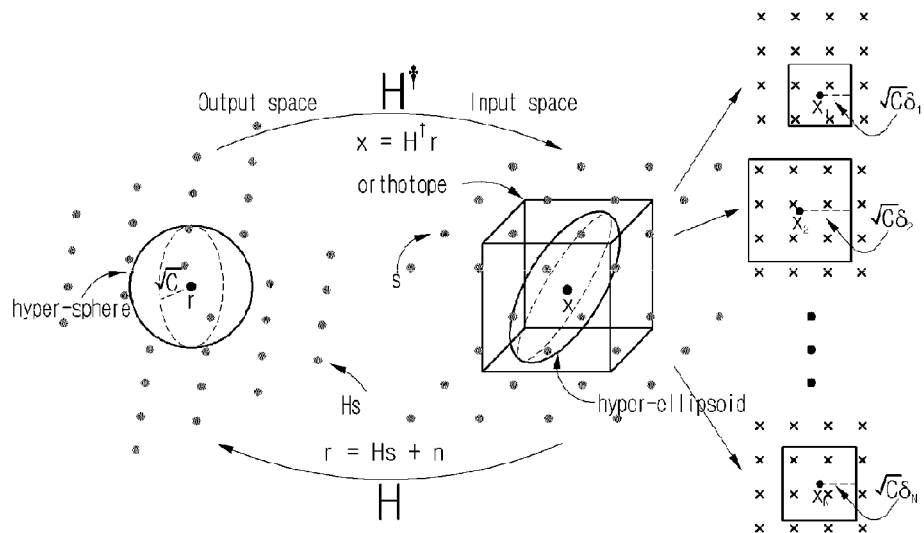
FIG. 2 is a view showing an input space and an output space for orthotope sphere decoding in accordance with one embodiment of the present invention.

FIG. 2 is a view showing an input space and an output space for orthotope sphere decoding according to the embodiment of the present invention. Each of the symbols in the figure represents a 16-QAM constellation point.

When the number of antennas of the receiver 20 is M and the number of antennas of the transmitter 10 is N in the multiple antenna system, a channel model of the multiple antenna system can be expressed as follows:

$$r = Hs + n$$

wherein $r = [r_1, \ldots, r_M]^T$ denotes received signals. H denotes an M×N block Rayleigh fading channel matrix. Each entry of H is a Gaussian distributed random variable of an IID (independently and identically distributed) complex number control-mean unit. Here, the channel matrix is a value provided by the receiver 20. $s = [s_1, \ldots, s_N]^T$ denotes symbol vectors transmitted from the transmitter 10 and satisfies $s \in \mathcal{O}^N \subset \mathbb{C}^N$. Here, $\mathcal{O}$ denotes constellation points of a signal in complex number domain $\mathbb{C}$. $n = [n_1, \ldots, n_M]^T$ denotes AWGN (additive white Gaussian noise) vectors and has zero-mean and variance $\rho^2$.

The orthotope sphere decoder according to the embodiment is applied to lattice Hs ($s \in \mathcal{O}^N \subset \mathbb{C}^N$) having a complex number.

H(k,:) denotes the k-th row of matrix H. $H^\dagger$ denotes inverse numbers of matrix H. Each component of the vector is expressed as a subscript. For example, $s_k$ denotes k-th component of vector S. $\mathcal{O}$ denotes cardinality of set $\mathcal{O}$. $\|s\|$ denotes the second norm of vector S. $\mathbb{C}$ denotes a complex number domain.

In orthotope sphere decoding, additional constraints are applied to sphere decoding.

A tree search is performed in the sphere decoding. QR decomposition is performed on matrix H in sphere decoding. The sphere decoding does not calculate a full Euclidean distance and examines whether or not constellation points are within a certain sphere radius $\sqrt{C}$ using a partial matrix. These conditions are referred to as sphere constraints (SCs) and can be expressed as follows:

$$d_k = \sum_{i=k}^{N} |q_i|^2 \leq C$$

wherein $d_k$ denotes a square root of a partial Euclidean distance at the k-th level ($1 \leq k \leq N$). $q_i$ denotes the i-th component of $q = R(x-s)$. At this point, R denotes the upper triangular matrix in QR decomposition of matrix H. $x = H^\dagger i^*$.

The concept of the orthotope can be specified through parameters of orthotope square width (OSW). The orthotope can be specified as a collection of center points $x = [x_1, x_2, \ldots, x_N]^T$ and widths of spaces $w = [w_1, w_2, \ldots, w_N]^T$ restricting the orthotope. The concept of the orthotope is extended to the complex plane so as to explain each dimension of the orthotope using the complex plane instead of the spaces. Accordingly, two space widths can be used for real and imaginary numbers in order to restrict each complex plane of the orthotope.

$$H := \{c \| \Re(c_i - x_i)| \leq w_i, |\Im(c_i - x_i)| \leq w_i, c_i, x_i \in \mathbb{C}, w_i \in \mathbb{R}, 1 \leq i \leq N\}$$

Each dimension of the orthotope is a square.

The orthotope square width (OSW) can be expressed as $\delta_1, \delta_2, \ldots, \delta_N$ ($\delta_k = \|H^\dagger(k,:)\|$) and is proportional to the widths of the orthotope squares. The widths of the orthotope squares are OSWs and maintain the same relative proportionality. This is referred to as an OSW constraint.

An O-metric can be used to examine whether or not constellation point $s_k$ is inside the orthotope. The O-metric is obtained by measuring how far a constellation point is positioned from the center of pertinent orthotope square $x_k$. O-metric $\Delta(s_k)$ of a candidate constellation point $s_k$ is a minimum square width containing the constellation point within the boundary thereof and can be expressed as the following equation:

$$\Delta(s_k) = \max\{|\Re(s_k) - \Re(x_k)|, |\Im(s_k) - \Im(x_k)|\}$$

wherein $\Re(s_k)$ is the real number part of $s_k$, and $\Im(s_k)$ is the imaginary number part of $s_k$.

If the O-metric of a certain constellation point $s_k$ is smaller than the k-th orthotope square width, the constellation point is inside the orthotope. This is referred to as an orthotope constraint (OC) and can be expressed as a mathematical shown below.

$$\Delta(s_k) \leq \sqrt{C} \cdot \delta_k \text{ for } k = 1, \ldots, N$$

The degree of pruning accomplished through an OC test depends on the constraints applied to the size of the orthotope. The smaller the orthotope is, the better the pruning will be. In order to accomplish the best pruning, a minimum orthotope needs to be selected while using the ML technique. Vector points existing inside the minimum orthotope are not pruned through the OC test, because these points are inside the orthotope which always passes the OC test. The points or symbols existing inside the orthotope at each level are referred to as unavoidable constellation points (UCPs). If the unavoidable constellation points are determined at each level, the number of constellation points that will be pruned at each level is calculated by subtracting the number of unavoidable constellation points from the total number constellation points.

The unavoidable constellation points with respect to $s_k$ are inside the k-th square of the minimum orthotope including the ML solution. However, the exact number of the unavoidable constellation points cannot be acquired until the tree search is completed since the OC test for confirming the unavoidable constellation points is required to have knowledge about the radius of the minimum hyper-sphere including the ML solution. That is, it is the Euclidean distance of the ML solution for received signal r.

Instead, a lower bound of the number of unavoidable constellation points can be used. In order to find the lower bound, a minimum orthotope containing at least one vector point which does not need to be an ML solution can be selected. This orthotope is referred to as a minimum orthotope (MO).

The minimum orthotope has a center at $x = H^\dagger r$, and this is the smallest orthotope containing at least one vector $S \in \mathcal{O}^N$. There is one orthotope at each level, and the orthotope includes N squares. Each square of the minimum orthotope should contain at least one constellation point. This is referred to as a minimum orthotope-level constraint. In addition, the squares of the minimum orthotope should satisfy the OSW constraints.

Therefore, the squares inside the minimum orthotope should satisfy both the MO-level constraints and the OSW constraints. In addition, no orthotope can be smaller than the minimum orthotope and should contain one constellation point. The constellation points inside the minimum orthotope are confirmed before tree search is started.

A constellation point where O-metric $\Delta(s_k)$ satisfies the test shown below is inside the minimum orthotope.

$$\Delta(s_k) \leq \sqrt{C_{min}} \cdot \delta_k$$
$$\left(\text{Here, } C_{min} = \max_{k=1,2,\ldots,N}\left[(\delta_k^{-1})^2 \min_{s_k \in O}(\Delta^2(s_k))\right]\right)$$

$S_{kd\ k}$ denotes the k-th norm of an inverse channel matrix, $s_k$ denotes a constellation point, $\Delta(s_k)$ denotes the O-metric of $s_k$, and k denotes a level of an antenna.

FIG. 3 is a view of constellation points on a minimum orthotope in orthotope sphere decoding in accordance with one embodiment of the present invention.

FIG. 3(a) shows a minimum required width for each level of the minimum orthotope in the orthotope sphere decoding according to the present embodiment of the invention. FIG. 3(b) shows a minimum required $s_k$ radius for each level. FIG. 3(c) shows the minimum orthotope.

The minimum orthotope of the orthotope sphere decoding will be described with reference to FIG. 3. In the figure, 16-QAM constellation points are used. The minimum width of a square needed at each level is obtained according to the MO-level constraints, i.e., $$\min_{s_k \in O}(\Delta(s_k)).$$

This confirms that each square has at least one constellation point therein. Next, a minimum radius required for each level can be calculated using $$(\delta_k^{-1})\min_{s_k \in O}(\Delta(s_k)).$$

Next, in order to establish a minimum orthotope satisfying the OSW constraints, a maximum radius should be selected from a set of minimum required radiuses as shown in $$\sqrt{C_{min}} = \max_{k=1,2,\ldots,N}\left[(\delta_k^{-1})\min_{s_k \in O}(\Delta(s_k))\right].$$

If a square is set according to $\sqrt{C_{min}} \cdot \delta_k$, the OSW constraints will be satisfied. As shown in FIG. 3, there are one or more constellation points inside the squares. In this embodiment, there is one constellation point at level 1, four constellation points at level 2, and two constellation points at level N because most of squares in the orthotope contain more constellation points as they grow bigger to satisfy the OSW constraints. The number of constellation points in each square of the orthotope is determined based on the center point X and the OSW.

In addition to confirming the constellation points exiting inside the minimum orthotope, an upper bound of the number of constellation points that can be pruned at each level can be determined This is referred to as pruning potential at each level. The pruning potential at each level can be obtained using the number of constellation points inside the minimum orthotope.

Figure 4:
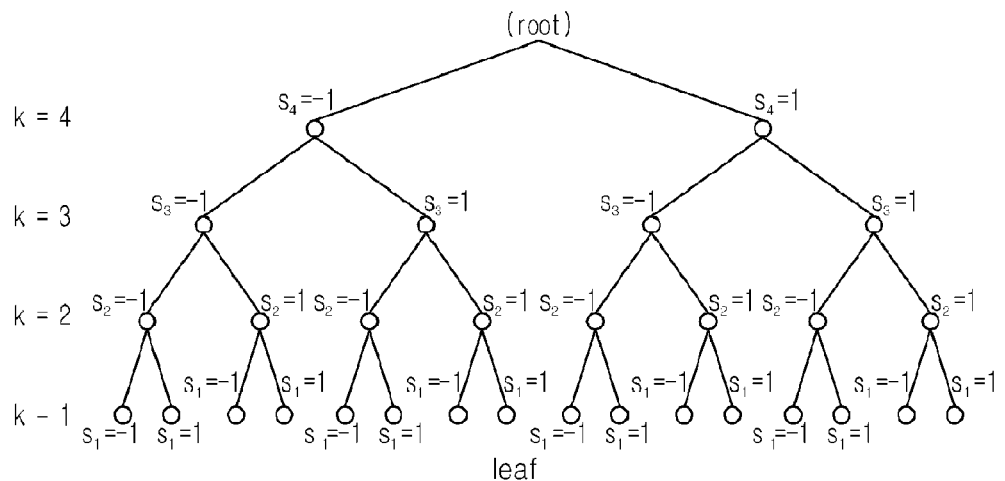
FIG. 4 is a view of a tree structure used for tree search in orthotope sphere decoding in accordance with one embodiment of the present invention.

FIG. 4 is a view of a tree structure used for tree search in orthotope sphere decoding in accordance with one embodiment of the present invention.

Referring to FIG. 4, a BPSK modulation scheme used in the multiple antenna system having four antennas is described as an example. The four antennas configure four levels in a tree.

The orthotope sphere decoder 200 in accordance with one embodiment of the present invention performs tree search on a tree which has nodes corresponding to transmission symbols. Leaves of the tree represent all candidate symbol vectors that can be mapped to the tree.

The orthotope sphere decoder 200 performs tree search by visiting the nodes on a path reaching to a leaf node from a root of a tree in the depth-first method.

The orthotope sphere decoder 200 detects transmission symbols by performing an OC-test or an SC-test on each node in the process of searching the tree.

At this point, if an orthotope is smaller than the minimum orthotope set by performing the OC-test or the SC-test, the search is not continued below the corresponding node, and the search flow moves to an upper level. If the search is not continued to subordinate nodes, this is referred to as pruning. In order to perform the OC-test or the SC-test, an O-metric or a PED should be calculated at each node.

A square root of the PED is calculated at each node to perform the SC-test while visiting the node. If a node does not pass the SC-test, leaves of the node are highly probable not to pass the SC-test. Accordingly, the nodes subordinate to the corresponding nodes are pruned from the tree.

Most of the PED calculation for performing the SC-test is complex number operations while the sphere decoding search is performed. The PED calculation at the k-th level of the tree needs 8(N−k)+11 floating point operations (1≤k≤N). If some of the PED calculation can be removed, complexity of the sphere decoding can be reduced.

The orthotope sphere decoder 200 in accordance with one embodiment of the present invention performs optimum tree mapping in order to reduce the burden of calculating the O-metric or the PED at each node when tree search is performed.

To this end, the orthotope sphere decoder 200 predicts and calculates potential of a node to be pruned from the tree when the node is at the root, by performing the OC-test at each node. Then, a node having the largest potential among the predicted and calculated potentials is placed at the root of the tree.

If a node having the highest pruning potential is placed at the root of the tree, further more subordinate nodes can be pruned when the corresponding node is pruned in the process of tree search. Accordingly, the number of nodes to visit in the tree search is reduced. If the number of nodes to visit in the tree search is reduced, operations for calculating the O-metric and the PED are reduced when the OC-test is performed. If operations for calculating the O-metric and the PED are reduced, performance of the orthotope sphere decoding can be improved.

Figure 5:
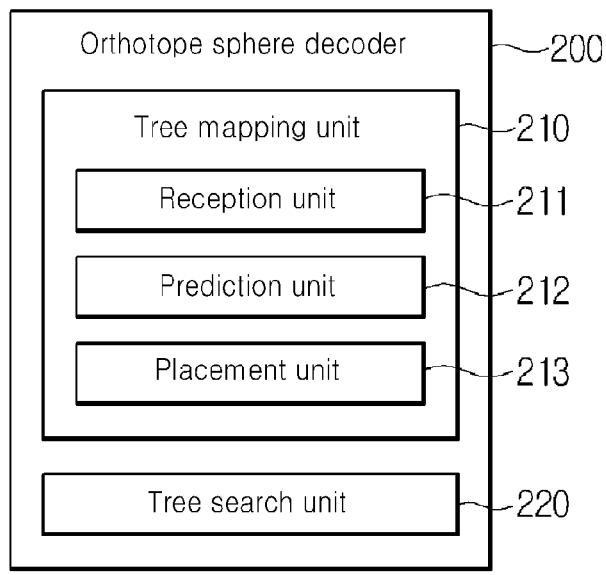
FIG. 5 is a view of an orthotope sphere decoder for signal reconstruction of a multiple antenna system in accordance with one embodiment of the present invention.

FIG. 5 is a view of an orthotope sphere decoder for signal reconstruction of a multiple antenna system in accordance with one embodiment of the present invention.

Referring to FIG. 5, the sphere decoder 200 of a multiple antenna system in accordance with one embodiment of the present invention includes a tree mapping unit 210 and a tree search unit 220.

The tree mapping unit 210 tree maps a node having the highest pruning potential that can be predicted at a root of a tree to the root level of the tree, among the nodes to be mapped to the tree of the orthotope sphere decoding.

The tree search unit 220 performs tree search of the orthotope sphere decoding for the tree mapped nodes. The tree search unit 220 can perform the tree search by performing pruning on the tree mapped by the tree mapping unit 210, through the OC-test.

The mapping unit 210 may include a reception unit 211, a prediction unit 212 and a placement unit 213.

The reception unit 211 receives transmission symbols of the multiple antenna system transmitted from the antennas of the transmitter 10.

The prediction unit 212 predicts pruning potential at the tree root for each node that will be mapped to the tree in correspondence to each received transmission symbol.

The prediction unit 212 may use, as the pruning potential, a numerical value which expresses possibility of a node to be pruned from the root of the tree through the OC-test.

The prediction unit 212 may use, as the pruning potential, an upper bound of the number of constellation points corresponding to each symbol of a node that will be pruned through the OC-test and removed through tree search.

The prediction unit 212 calculates the number of constellation points within the radius of a threshold value set by the OC-test.

The prediction unit 212 may use, as the upper bound of the number of the constellation points, a value calculated by subtracting the number of constellation points within the radius of a threshold value from the total number of constellation points in the node.

The threshold value may have an orthotope radius containing at least one constellation point within the radius from the center point of the orthotope.

If the constellation point satisfies the following equation, it is within the radius of the set threshold value, and otherwise, it is out of the radius of the set threshold value.

$$\Delta(s_k) \leq \sqrt{C_{min}} \cdot \delta_k \quad \text{[Equation]}$$

wherein $$C_{min} = \max_{k=1,2,\ldots,N} \left[ (\delta_k^{-1})^2 \min_{s_k \in O} (\Delta^2(s_k)) \right],$$

$\delta_k$ denotes the k-th norm of an inverse channel matrix, $s_k$ denotes a constellation point, $\Delta(s_k)$ denotes the O-metric of $s_k$, and k denotes a level of an antenna.

The placement unit 213 places a node having the highest pruning potential at the root level of the tree.

FIG. 6 is a flowchart of an orthotope sphere decoding method in accordance with one embodiment of the present invention.

Referring to FIG. 6, in S10 of the orthotope sphere decoding method according to one embodiment, the tree mapping unit 210 tree maps a node having the highest pruning potential that can be predicted at a root of a tree to the root level of the tree, among the nodes to be mapped to the tree of the orthotope sphere decoding.

In S20, the tree search unit 220 performs tree search of the orthotope sphere decoding for the nodes tree mapped by the tree mapping unit 210.

FIG. 7 is a flowchart of a tree mapping operation of an orthotope sphere decoding method in accordance with one embodiment of the present invention.

Referring to FIG. 7, in the tree mapping operation of the orthotope sphere decoding method according to the present embodiment, the reception unit 211 receives transmission symbols of the multiple antenna system in S111.

In S112, the prediction unit 212 predicts pruning potential at the tree root for each node that will be mapped to the tree in correspondence to each transmission symbol received by the reception unit 211.

In S112, the prediction unit 212 may use, as the pruning potential, a numerical value which expresses possibility of a node to be pruned from the root of the tree through the OC-test in order to predict the pruning potential.

In S112, the prediction unit 212 may use, as the pruning potential, an upper bound of the number of constellation points corresponding to each symbol of a node that will be pruned through the OC-test and removed through tree search in order to predict the pruning potential.

In S113, the placement unit 213 places a node having the highest pruning potential at the root level of the tree.

FIG. 8 is a flowchart of a potential prediction operation of an orthotope sphere decoding method in accordance with one embodiment of the present invention.

Referring to FIG. 8, in the potential prediction operation of the orthotope sphere decoding method according to the present embodiment, the prediction unit 212 calculates the number of constellation points within the radius of a threshold value set by the OC-test in S1121.

In S1122, the prediction unit 212 uses, as the upper bound of the number of the constellation points, a value calculated by subtracting the number of constellation points within the radius of a threshold value from the total number of constellation points in the node.

Here, the set threshold value may have an orthotope radius containing at least one constellation point within the radius from the center point of the orthotope.

If the constellation point satisfies the following equation, it is within the radius of the set threshold value, and otherwise, it is out of the radius of the set threshold value:

$$\Delta(s_k) \leq \sqrt{C_{min}} \cdot \delta_k \quad \text{[Equation]}$$

wherein $$C_{min} = \max_{k=1,2,\ldots,N} \left[ (\delta_k^{-1})^2 \min_{s_k \in O} (\Delta^2(s_k)) \right]$$

$\delta_k$ denotes the k-th norm of an inverse channel matrix, $s_k$ denotes a constellation point, $\Delta(s_k)$ denotes the O-metric of, and $s_k$ denotes a level of an antenna.

Figure 9:
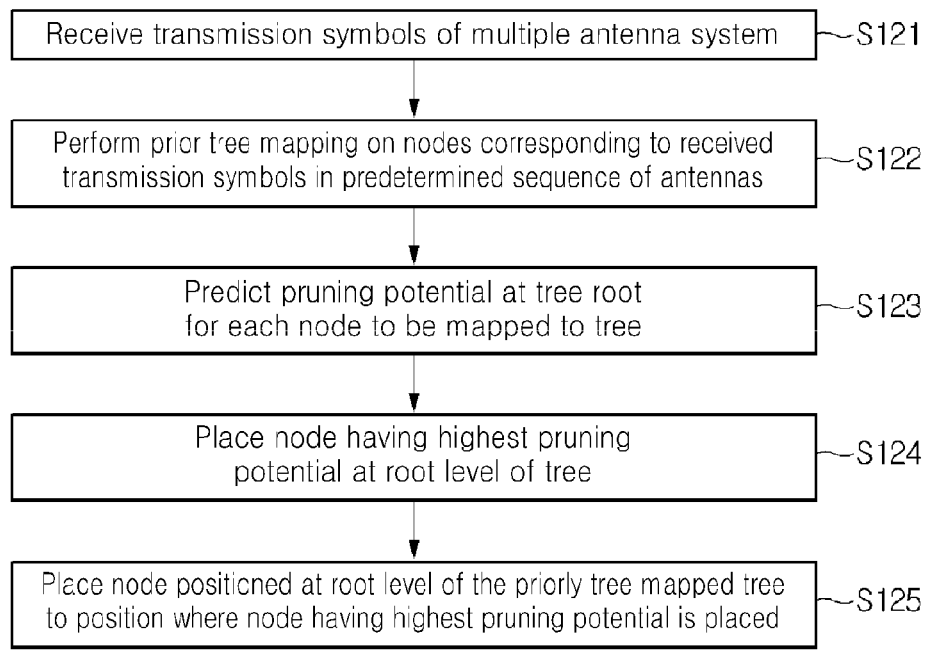
FIG. 9 is a flowchart of a tree mapping operation of an orthotope sphere decoding method in accordance with another embodiment of the present invention.

FIG. 9 is a flowchart of a tree mapping operation of an orthotope sphere decoding method in accordance with another embodiment of the present invention.

Referring to FIG. 9, in the tree mapping operation of the orthotope sphere decoding method in accordance with the present embodiment, the reception unit 211 receives transmission symbols of the multiple antenna system in S121.

In S122, the placement unit 213 performs prior tree mapping on the nodes corresponding to the received transmission symbols in a predetermined sequence of antennas.

In S123, the prediction unit 212 predicts pruning potential at the tree root for each node that will be mapped to the tree in correspondence to each transmission symbol.

In S124, the placement unit 213 places a node having the highest pruning potential at the root level of the priorly tree mapped tree based on a result of the prediction of the prediction unit 212.

In S125, the placement unit 213 places the node positioned at the root level of the priorly tree mapped tree to the position where the node having the highest pruning potential is placed.

That is, the placement unit 213 may perform tree mapping by exchanging positions of the node having the highest pruning potential and the node positioned at the root level of the priorly tree mapped tree.

Figure 10:
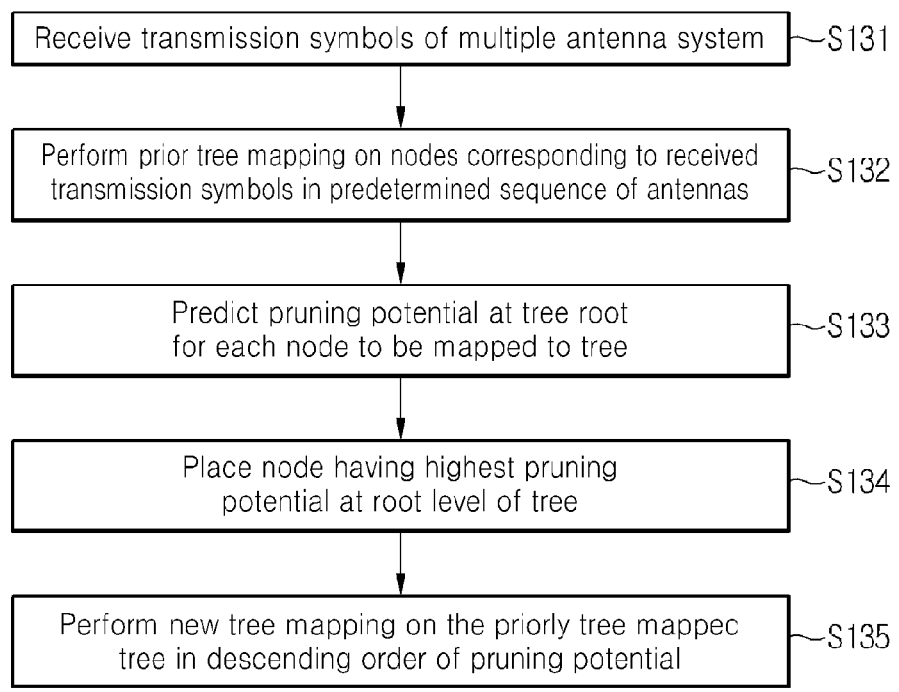
FIG. 10 is a flowchart of a tree mapping operation of an orthotope sphere decoding method in accordance with a further embodiment of the present invention.

FIG. 10 is a flowchart of a tree mapping operation of an orthotope sphere decoding method in accordance with a further embodiment of the present invention.

Referring to FIG. 10, in the tree mapping operation of the orthotope sphere decoding method in accordance with the present embodiment, the reception unit 211 receives transmission symbols of the multiple antenna system in S131.

In S132, the placement unit 213 performs prior tree mapping on the nodes corresponding to the received transmission symbols in a predetermined sequence of antennas.

In S133, the prediction unit 212 predicts pruning potential at the tree root for each node that will be mapped to the tree in correspondence to each transmission symbol.

In S134, the placement unit 213 places a node having the highest pruning potential at the root level of the priorly tree mapped tree based on a result of the prediction of the prediction unit 212.

In S135, the placement unit 213 performs new tree mapping on the priorly tree mapped tree in descending order of pruning potential.

Although some exemplary embodiments have been described herein, it should be understood by those skilled in the art that these embodiments are given by way of illustration only, and that various modifications, variations and alterations can be made without departing from the spirit and scope of the invention. The scope of the present invention should be defined by the appended claims and equivalents thereof.

What is claimed is:

1. An orthotope sphere decoding method of a multiple antenna system, comprising:
   tree mapping a node having highest pruning potential that can be predicted at a root of a tree of orthotope sphere decoding to a root level of the tree, among nodes to be mapped to the tree; and
   performing tree search of the orthotope sphere decoding on the nodes mapped to the tree, wherein the tree mapping comprises:
   receiving transmission symbols of the multiple antenna system;
   predicting pruning potential at the tree root for each node that will be mapped to the tree in correspondence to each received transmission symbol; and
   placing a node having the highest pruning potential at the root level of the tree, and
   wherein the predicting pruning potential uses, as the pruning potential, a numerical value which expresses possibility of a node to be pruned from the root of the tree through an orthotope constraint test (OC-test), and
   wherein the predicting pruning potential uses, as the pruning potential, an upper bound of the number of constellation points corresponding to each symbol of the node that will be pruned through the OC-test and removed through tree search.

2. The orthotope sphere decoding method according to claim 1, wherein the predicting pruning potential comprises:
   calculating the number of constellation points within a radius of a threshold value set by the OC-test; and
   using, as the upper bound of the number of the constellation points, a value calculated by subtracting the number of constellation points within the radius of the threshold value from the total number of constellation points in the node.

3. The orthotope sphere decoding method according to claim 2, wherein the set threshold value is a minimum orthotope threshold value having an orthotope radius containing at least one constellation point within a radius from a center point of the orthotope.

4. The orthotope sphere decoding method according to claim 3, wherein, if an O-metric of the constellation point satisfies the following equation, the constellation point is within the radius of the set threshold value, and otherwise, the constellation point is outside the radius of the set threshold value:

$$\Delta(s_k) \leq \sqrt{C_{min}} \cdot \delta_k,$$

wherein $$C_{min} = \max_{k=1,2,\ldots,N} \left[ (\delta_k^{-1})^2 \min_{s_k \in O} (\Delta^2(s_k)) \right],$$

$\delta_k$ denotes a k-th norm of an inverse channel matrix, $s_k$ denotes a constellation point, $\Delta(s_k)$ denotes an O-metric of $s_k$, and k denotes a level of an antenna.

5. The orthotope sphere decoding method according to claim 1, wherein the performing tree search comprises performing the tree search by performing pruning on the mapped tree through the OC-test.

6. An orthotope sphere decoding method of a multiple antenna system, comprising:
   tree mapping a node having highest pruning potential that can be predicted at a root of a tree of orthotope sphere decoding to a root level of the tree, among nodes to be mapped to the tree; and
   performing tree search of the orthotope sphere decoding on the nodes mapped to the tree, wherein the tree mapping comprises:
   receiving transmission symbols of the multiple antenna system;
   performing prior tree mapping on nodes corresponding to the received transmission symbols in a predetermined sequence of antennas;
   predicting the pruning potential at the tree root for each node in correspondence to each transmission symbol; and
   placing a node having the highest pruning potential at the root level of the priorly tree mapped tree based on a result of the prediction, and
   wherein the placing a node at the root level comprises performing tree mapping by exchanging positions of the node having the highest pruning potential and a node positioned at the root level of the priorly tree mapped tree.

7. An orthotope sphere decoding method of a multiple antenna system, comprising:
   tree mapping a node having highest pruning potential that can be predicted at a root of a tree of orthotope sphere decoding to a root level of the tree, among nodes to be mapped to the tree; and
   performing tree search of the orthotope sphere decoding on the nodes mapped to the tree, wherein the tree mapping comprises:
   receiving transmission symbols of the multiple antenna system;
   performing prior tree mapping on nodes corresponding to the received transmission symbols in a predetermined sequence of antennas;

predicting the pruning potential at the tree root for each node in correspondence to each transmission symbol; and placing a node having the highest pruning potential at the root level of the priorly tree mapped tree based on a result of the prediction, and wherein the tree mapping further comprises performing new tree mapping on the priorly tree mapped tree in descending order of pruning potential based on the result of the prediction.

8. An orthotope sphere decoding apparatus of a multiple antenna system, the apparatus comprising:

a tree mapping unit which performs tree mapping of a node having highest pruning potential that can be predicted at a root of a tree of orthotope sphere decoding to a root level of the tree, among nodes to be mapped to the tree; and a tree search unit which performs tree search of the orthotope sphere decoding on the nodes mapped to the tree, wherein the tree mapping unit includes:

a reception unit which receives transmission symbols of the multiple antenna system;

a prediction unit which predicts pruning potential at the tree root for each node that will be mapped to the tree in correspondence to each received transmission symbol; and a placement unit which places a node having the highest pruning potential at the root level of the tree, and wherein the prediction unit uses, as the pruning potential, a numerical value which expresses possibility of a node to be pruned from the root of the tree through an orthotope constraint test (OC-test), and wherein the prediction unit uses, as the pruning potential, an upper bound of the number of constellation points corresponding to each symbol of the node that will be pruned through the OC-test and removed through tree search.

9. The orthotope sphere decoding apparatus according to claim 8, wherein the prediction unit calculates the number of constellation points within a radius of a threshold value set by the OC-test; and uses, as the upper bound of the number of the constellation points, a value calculated by subtracting the number of constellation points within the radius of the threshold value from the total number of constellation points in the node.

* * * * *